US011608469B2

(12) United States Patent
Sun (10) Patent No.: US 11,608,469 B2
(45) Date of Patent: Mar. 21, 2023

(54) METHOD FOR PREPARING NANO-QUANTUM DOT, NANO-QUANTUM DOT MATERIAL, APPLICATION AND QUANTUM DOT ARTICLE

(71) Applicant: Xuyang Sun, Jiaxing (CN)

(72) Inventor: Xuyang Sun, Jiaxing (CN)

(*) Notice: Subject to any disclaimer, the term of this patent is extended or adjusted under 35 U.S.C. 154(b) by 183 days.

(21) Appl. No.: 16/977,395

(22) PCT Filed: Feb. 26, 2019

(86) PCT No.: PCT/CN2019/076174
§ 371 (c)(1),
(2) Date: Sep. 1, 2020

(87) PCT Pub. No.: WO2019/165958
PCT Pub. Date: Sep. 6, 2019

(65) Prior Publication Data
US 2021/0062086 A1 Mar. 4, 2021

(30) Foreign Application Priority Data
Mar. 2, 2018 (CN) .......................... 201810175744.5

(51) Int. Cl.
*C09K 11/88* (2006.01)
*C09K 11/02* (2006.01)
(Continued)

(52) U.S. Cl.
CPC .......... *C09K 11/883* (2013.01); *C09K 11/025* (2013.01); *C09K 11/58* (2013.01);
(Continued)

(58) Field of Classification Search
CPC ...... B82Y 30/00; C09K 11/883; C09K 11/881
See application file for complete search history.

(56) References Cited

FOREIGN PATENT DOCUMENTS

| CN | 101441295 A | 5/2009 |
|---|---|---|
| CN | 102674692 A | 9/2012 |

(Continued)

OTHER PUBLICATIONS

Dong. Broadband Near-Infrared Luminescence and Tunable Optical Amplification Around 1.55 μm and 1.33 μm of PbS Quantum Dots in Glasses. Journal of Alloys and Compounds 509(38):9335-9339. 2011 (Year: 2011).*

(Continued)

*Primary Examiner* — Matthew E. Hoban
(74) *Attorney, Agent, or Firm* — BCF LLP (57) ABSTRACT

The application discloses a method for preparing a nano-quantum dot, a nano-quantum dot material, the application thereof and a quantum dot article, and relates to the technical field of quantum dot material preparation. The method for preparing the nano-quantum dot includes the following steps: rapidly solidifying a high-temperature melt in which a carrier corresponding to a target product ion/atomic group/molecular group is dissolved to obtain a carrier in which the target product nano-quantum dot is embedded. The nano-quantum dot material is prepared by using the method. The nano-quantum dot material is applied to the fields of luminescent devices, optical biological marks, disease detection, semiconductors or photoelectricity. Moreover, a quantum dot article containing the nano-quantum dot material is provided.

16 Claims, 2 Drawing Sheets

(51) Int. Cl.
 C09K 11/58 (2006.01)
 C09K 11/59 (2006.01)
 C09K 11/65 (2006.01)
 B82Y 20/00 (2011.01)
 B82Y 40/00 (2011.01)
(52) U.S. Cl.
 CPC .............. *C09K 11/59* (2013.01); *C09K 11/65* (2013.01); *B82Y 20/00* (2013.01); *B82Y 40/00* (2013.01)

(56) References Cited

FOREIGN PATENT DOCUMENTS

| CN | 104529152 A | 4/2015 |
| CN | 105524613 A | 4/2016 |
| CN | 107043098 A | 8/2017 |
| CN | 108203582 A | 6/2018 |

OTHER PUBLICATIONS

Wang. Synthesis of fluorescent polymeric carbon nitride quantum dots in molten salts for security inks. New Journal of Chemistry Issue 24 2017 (Year: 2017).*

Sterner. Phase relations in the system NaCl-KCl-H,O: V. Thermodynamic-PIX analysis of solid-liquid equilibria at high temperatures and pressures. Geochimica et Cosmochica Acta vol. 56 pp. 2295-2309 (Year: 1992).*

International Search Report (including English Translation) and Written Opinion with regard to PCT/CN2019/076174 dated May 10, 2019.

Wang, Yaping et al., "Synthesis of Fluorescent Polymeric Carbon Nitride Quantum Dots in Molten Salts for Security Inks", New J. Chem., vol. 41, Oct. 26, 2017 (Oct. 26, 2017), ISSN: II44-054.

Shavel A. et al., "Colloidal Synthesis of Silicon Nanoparticles in Molten Salts", Nanoscale, vol. 9, May 12, 2017 (May 12, 2017), ISSN: II44-054.

English Abstract for CN105524613 retrieved on Espacenet on Sep. 1, 2020.

English Abstract for CN102674692 retrieved on Espacenet on Sep. 1, 2020.

English Abstract for CN108203582 retrieved on Espacenet on Sep. 1, 2020.

English Abstract for CN101441295 retrieved on Espacenet on Sep. 1, 2020.

English Abstract for CN107043098 retrieved on Espacenet on Sep. 1, 2020.

English Abstract for CN104529152 retrieved on Espacenet on Sep. 1, 2020.

Notification to Grant with regard to the CN Patent Application No. 201810175744.5 dated Dec. 10, 2019.

Office Action with regard to the CN Patent Application No. 201810175744.5 dated Apr. 26, 2019.

Office Action with regard to the CN Patent Application No. 201810175744.5 dated Sep. 23, 2019.

* cited by examiner

METHOD FOR PREPARING NANO-QUANTUM DOT, NANO-QUANTUM DOT MATERIAL, APPLICATION AND QUANTUM DOT ARTICLE

CROSS-REFERENCE TO RELATED APPLICATIONS

The present application is a National Stage of International Application No. PCT/CN2019/076174, filed on Feb. 26, 2019, which claims priority to Chinese Patent Application number 201810175744.5, entitled "Method for Preparing Nano-quantum Dot, Nano-quantum Dot Material, Application and Quantum Dot Article" filed on Mar. 2, 2018, with the Chinese Patent Office, the contents of each of which are incorporated herein by reference in their entirety.

TECHNICAL FIELD

The present disclosure relates to the technical field of preparing quantum dot material, in particular to a method for preparing nano-quantum dots, a nano-quantum dot material, application (use) and a quantum dot article.

BACKGROUND ART

Quantum dot, also referred to as nanocrystal, is a quasi-zero-dimensional nanomaterial, and is composed of a small amount of atoms. It is generally considered that the quantum dot is a dot-shaped substance sized below 100 nanometers (nm) in three dimensions, and movement of internal electrons thereof is restricted in all directions, thus the quantum confinement effect is significant, and the discrete quantum energy level structure thereof may emit fluorescence after being excited. In addition, the nano-scale of the quantum dot makes the proportion of surface atoms thereof much higher than that of bulk material, leading to relatively large surface defect effect. Based on these quantum effects, quantum dots have a wide application prospect in fields such as light emitting devices, optical biomarkers and semiconductors. In particular, quantum dot luminescence has excellent fluorescence characteristics such as wide and continuously distributed excitation spectrum, narrow and symmetrical emission spectrum, adjustable color, high photochemical stability, and long fluorescence lifetime, which is an ideal fluorescent material. Meanwhile, the quantum dots are also wildly applied in many fields due to its thermal, electromagnetic, chemical and catalytic, mechanical properties, among others.

Currently, the method for preparing quantum dots mainly includes a physical method and a chemical method, primarily the chemical method: including synthesis in an organic system by adopting a colloid chemical method and synthesis by a hydrothermal method. Researches on quantum dots started first from CdSe quantum dots inlaid in glass in 1990s. In 1993, Bawendi et al. used, for the first time, dimethylcadmium ($Cd(CH_3)_2$) and trioctylphosphine selenide (SeTOP) as precursors, and trioctylphosphine oxide (TOPO) as a ligand solvent, to synthesize high-efficiency light-emitting cadmium selenide (CdSe) quantum dots, and then added excess methanol to obtain CdSe nanoparticles by centrifugation, with a quantum yield of about 10%.

Carbon quantum dots (CQDs or CDs) also have fluorescent effect and other quantum effects. Compared with metal quantum dots, the carbon quantum dots are nontoxic and have little harm to the environment. Currently, there are few methods for preparing carbon quantum dots as reported, and methods for preparing carbon quantum dots having fluorescent properties include: a high-temperature, high-pressure cutting method, i.e., cutting carbon nanotubes with laser to obtain carbon quantum dots having a diameter of less than 5 nm; a candle burning method, i.e., obtaining hydrophilic carbon quantum dots with carboxyl and hydroxyl on surface by collecting and treating candle ash with acid, wherein the diameter of the carbon quantum dots is about 1 nm; an electrochemical scanning method, i.e., in acetonitrile and tetrabutylammonium perchlorate supporting electrolyte, through electrochemical cyclic voltammetry scanning, enabling tetrabutylammonium perchlorate to enter gaps of carbon nanotubes, and peeling carbon quantum dots (with diameter of about 2.8 nm) off from defects of the carbon nanotubes; and a hydrothermal synthesis method, i.e., selecting organic carbon sources such as glucose, citric acid and banana juice for one-step hydrothermal synthesis.

All of the above methods have the problems of high cost, low quantum yield and difficulty in controlling the particle size.

In view of this, the present disclosure is specifically proposed.

SUMMARY

A first object of the present disclosure is to provide a method for preparing nano-quantum dots, in which the nano-quantum dots are prepared in a manner of rapid solidification of high-temperature melt, with a low cost, high efficiency, little pollution, and good quality, a small particle size and narrow distribution of the quantum dots prepared.

A second object of the present disclosure is to provide a nano-quantum dot material prepared by the above method for preparing nano-quantum dots, from which a carrier material inlaid with nano-quantum dots can be directly obtained, wherein the quantum dots have a small size, a low dispersion degree, uniform distribution and good quality, and high-purity quantum dot powder or nano-quantum dot material with a special structure such as core-shell structure also can be obtained through subsequent treatment, facilitating subsequent use.

A third object of the present disclosure is to provide use of the nano-quantum dot material prepared by the above method for preparing nano-quantum dots in the fields of photoelectric devices, biomarkers or semiconductors.

A fourth object of the present disclosure is to provide a quantum dot article containing the nano-quantum dot material prepared by the above method for preparing nano-quantum dots.

In order to achieve the above objects of the present disclosure, following technical solutions are particularly adopted.

In a first aspect, a method for preparing nano-quantum dots is provided, including a step of:

rapidly solidifying a high-temperature melt of a carrier dissolved with corresponding ions/atomic groups/molecular groups of target product, so as to obtain the carrier inlaid with the target product nano-quantum dots.

Preferably, on the basis of the technical solution provided in the present disclosure, the ions/atomic groups/molecular groups of target product are obtained by reacting and/or thermally cracking corresponding precursor of target product in the high-temperature melt.

Preferably, on the basis of the technical solution provided in the present disclosure, the method for preparing nano-quantum dots includes steps of:

(a) providing a carrier, and heating the carrier to form a high-temperature melt as a solvent;

(b) providing the corresponding precursor of target product, reacting and/or thermally cracking the corresponding precursor of target product in the high-temperature melt, so as to obtain ions/atomic groups/molecular groups required for forming target product, and dissolving the ions/atomic groups/molecular groups as solute in the melt; and (c) rapidly solidifying the melt to separate out the solute or reactant of the solute upon supersaturation in a short time, so as to obtain the carrier inlaid with the target product nano-quantum dots; and optionally, washing off the carrier and adopting a dispersing means to obtain the target product nano-quantum dots.

Preferably, on the basis of the technical solution provided in the present disclosure, the target product includes an inorganic nonmetal simple substance, a metal or an inorganic compound;

Preferably, the target product nano-quantum dots include elemental quantum dots, binary compound quantum dots or ternary compound quantum dots;

Preferably, the carrier includes one or a combination of at least two of inorganic salts, inorganic bases, oxides, nitrides, carbides, metals and alloys, which are water soluble or readily soluble in acid and base;

Preferably, the carrier includes an inorganic salt, an inorganic base, an oxide, a nitride, a carbide, a metal or an alloy, which is readily soluble in water or readily soluble in acid and base, and further preferably includes one or a combination of at least two of NaCl, KCl, $Na_2SO_4$, $K_2SO_4$, NaOH, KOH, glass powder, quartz sand, metal Sn, metal Ni, metal Cu, metal Fe, metal Au, metal Ag, metal Bi, metal In or metal Ga;

Preferably, the rapid solidifying includes one or a combination of at least two atomization modes of pressurized spraying, high-pressure gas spraying, centrifugal spraying or ultrasonic atomization;

Preferably, an auxiliary cooling is performed by means of a refrigerant, pressure reduction or forced convection while the atomization is carried out.

Preferably, on the basis of the technical solution provided in the present disclosure, the corresponding precursor of target product is obtained through organification of corresponding target product or related components of the target product;

Preferably, the carrier is removed by water washing and/or acid and base washing and dispersing means is adopted to obtain the target product nano-quantum dots;

Further preferably, the dispersing means includes adding a dispersing agent and/or ultrasonic dispersing means;

Still further preferably, a modifier and/or a passivating agent is added, so as to modify the target product nano-quantum dots.

Preferably, on the basis of the technical solution provided in the present disclosure, the method for preparing nano-quantum dots further includes:

heating, after obtaining the carrier inlaid with the target product nano-quantum dots, the carrier again to form a high-temperature melt to keep the nano-quantum dots to be uniformly dispersed in the melt, and adding a modifier and/or a passivating agent, so as to modify the target product nano-quantum dots; and then rapidly solidifying the melt to obtain the carrier inlaid with the modified target product nano-quantum dots, or directly pouring the melt into a mold for cooling and molding.

Preferably, on the basis of the technical solution provided in the present disclosure, the carrier is heated to 450-1500° C., preferably 450-600° C., or 750-900° C., or 1000-1200° C., so as to form the high-temperature melt of the carrier;

Preferably, the corresponding precursor of target product is uniformly mixed in the carrier, heated to 450-1500° C., and reacted and/or thermally cracked to obtain the high-temperature melt of the carrier dissolved with corresponding ions/atomic groups/molecular groups of target product;

Preferably, a mass ratio of the corresponding precursor of target product to the high-temperature melt of the carrier is (0.01-1):(99-99.99) (0.01:99.99-1:99), preferably (0.1-0.5):(99.5-99.9) (0.1:99.9-0.5:99.5).

In a second aspect, a nano-quantum dot material prepared by the above method for preparing nano-quantum dots is provided.

Preferably, the nano-quantum dot material includes powder, a solution or a molded body containing the nano-quantum dots.

In a third aspect, use of the nano-quantum dot material prepared by the above method for preparing nano-quantum dots in the fields of photoelectric devices, biomarkers or semiconductors is provided.

In a fourth aspect, a quantum dot article containing the nano-quantum dot material prepared by the above method for preparing nano-quantum dots is provided.

Compared with the prior art, the present disclosure has following beneficial effects:

(1) In the method for preparing quantum dots in the present disclosure, the melt dissolved with the ions/atomic groups/molecular groups of target product is rapidly solidified to obtain the target product nano-quantum dots inlaid in the carrier fine powder. The target substance ions/atomic groups/molecular groups dissolved in the melt cannot be separated out in a large amount during rapid solidification, thus, have a small crystallization scale, and are frozen at original relative positions along with temperature reduction, so as to form the so-called "raisin bread" structure, wherein the so-called raisin is the quantum dot.

(2) The method for preparing nano-quantum dots by rapid solidification of high-temperature melt in the present disclosure has a simple technical route, and an exact reaction and thermodynamic growth mechanism, may adopt industrialized rapid solidification device, with small equipment investment, high unit yield and rapid reaction growth, thereby having low cost, high efficiency, little pollution, and capability of continuous production. The quantum dots prepared have a small size, narrow distribution and good quality. Moreover, the method in the present disclosure may be widely applied to preparation of quantum dots of a variety of substances, which does not rely on special reaction methods and paths, and is a common platform approach. Besides, in the process of preparing quantum dots in the present disclosure, the problems of regulating and controlling the size and the dispersion degree of the quantum dots can be solved by simple, inexpensive and easily controlled factors in industry, such as adjusting addition proportion of the precursor of the target product, and rapid solidification rate (such as rotating speed of centrifugal machine).

(3) With the preparation method of the present disclosure, the carrier inlaid with the target product nano-quantum dots can be directly obtained, the problem of moisture barrier can be solved, and the quantum dots in the carrier material have a small size, a low dispersion degree and uniform distribution, moreover, modified nano-quantum dots can be obtained through subsequent modification, and the modified nano-quantum dots have few defects and good stability. In the present disclosure, high-purity quantum dot powder also may be obtained by an inexpensive and efficient method such as water washing, thus facilitating subsequent use.

Reference signs: 1—atomized fine powder; 2—melt liquid flow; 3—heater; 4—crucible; 5—high-temperature melt; 6—metal round roller; 7—rotary metal disc.

DETAILED DESCRIPTION OF EMBODIMENTS

Embodiments of the present disclosure will be described in detail below in combination with examples, while a person skilled in the art would understand that the following examples are merely used for illustrating the present disclosure, but should not be considered as limitation to the scope of the present disclosure. If no specific conditions are specified in the examples, they are carried out under normal conditions or conditions recommended by manufacturers. If manufacturers of reagents or apparatuses used are not specified, they are conventional products commercially available.

According to a first aspect of the present disclosure, a method for preparing nano-quantum dots is provided, including a step of:

rapidly solidifying a high-temperature melt of a carrier dissolved with corresponding ions/atomic groups/molecular groups of target product to obtain the carrier inlaid with the target product nano-quantum dots.

The quantum dot material is a semiconductor cluster with a size of 1~20 nm, also called as semiconducting nanocrystal. The quantum dot materials currently in research are mostly composed of elements of Group II-VI or Group III-V, which have special optical properties, and the quantum dots are enabled to have relatively good fluorescent property due to the structural properties and fluorescence mechanism.

Currently, the synthesis methods of quantum dots mainly include a hydrothermal method, a thermal colloid method, a thermal injection method and so on, while all of these methods have problems of complicated process, high cost, low efficiency, dependence of different quantum dots on special reaction methods and paths, and difficulty in controlling particle size and dispersion degree.

The method of the present disclosure is a method for preparing nano-quantum dots by rapidly solidifying a high-temperature melt.

Typical but not-limiting target product nano-quantum dots include unitary elemental quantum dots (e.g., C quantum dots, Si quantum dots and gold quantum dots), binary compound quantum dots (quantum dots without heavy metal, or heavy metal-containing quantum dots, such as ZnO, ZnSe, SiO$_2$, CdS, CdSe, PbS and SiC) or ternary compound quantum dots (CdSe$_x$Te$_{1-x}$ and CuInS$_2$, among others).

Typical but non-limiting target products include inorganic nonmetal simple substances (e.g., carbon and silicon), metals (e.g., gold) or inorganic compounds (e.g., ZnSe, CdS and CdSe) and so on.

The high-temperature melt of the carrier dissolved with corresponding ions/atomic groups/molecular groups of target product refers to corresponding ions/atomic groups/molecular groups of target product being dissolved in the high-temperature melt of the carrier.

The "/" in "ions/atomic groups/molecular groups" means "and/or", that is, ions, atomic groups, molecular groups, ions and atomic groups, ions and molecular groups, atomic and molecular groups, and ions, atomic groups and molecular groups. The corresponding ions/atomic groups/molecular groups of target product being dissolved in the high-temperature melt of the carrier means the high-temperature melt of the carrier being dissolved with ions, or the high-temperature melt of the carrier being dissolved with atomic groups, or the high-temperature melt of the carrier being dissolved with molecular groups, or the high-temperature melt of the carrier being dissolved with ions and atomic groups, or the high-temperature melt of the carrier being dissolved with ions and molecular groups, or the high-temperature melt of the carrier being dissolved with atomic groups and molecular groups, or the high-temperature melt of the carrier being dissolved with ions, atomic groups and molecular groups. For example, when preparing carbon nano-quantum dots, the high-temperature melt of the carrier is dissolved with atomic groups and/or molecular groups of carbon; when preparing silicon nano-quantum dots, the high-temperature melt of the carrier is dissolved with atomic groups and/or molecular groups of silicon; when preparing gold nano-quantum dots, the high-temperature melt of the carrier is dissolved with atomic groups and/or molecular groups of gold; when preparing CdSe nano-quantum dots, the high-temperature melt of the carrier is dissolved with ions/atomic groups/molecular groups of CdSe.

Typical but non-limiting carriers include inorganic salts, inorganic bases, oxides, nitrides, carbides, metals or alloys, which are water soluble or readily soluble in acid and base, for example, the carrier is one or a combination of at least two of NaCl, KCl, Na$_2$SO$_4$, K$_2$SO$_4$, NaOH, KOH, glass powder, quartz sand, metal Sn, metal Ni, metal Cu, metal Fe, metal Au, metal Ag, metal Bi, metal In or metal Ga.

The high-temperature melt is obtained by heating the carrier which is solid at normal temperature to a molten state. The heating temperature is not limited as long as the carrier can be heated to the molten state to obtain the carrier melt.

Preferable ions/atomic groups/molecular groups of target product are obtained by reacting and/or thermally cracking corresponding precursor of target product in the high-temperature melt. That is, corresponding precursor of target product is uniformly mixed in the high-temperature melt, and undergoes reaction and/or thermal cracking to obtain the high-temperature melt of the carrier dissolved with the corresponding ions/atomic groups/molecular groups of target product.

Rapid solidifying refers to a process in which a melt is transformed from a liquid state to a solid state extremely fast at a much higher cooling rate than in the conventional process, and which requires an extremely higher degree of supercooling when the melt is solidified.

Preferably, it is a process in which a liquid phase (melt) is solidified into a solid phase at a cooling rate of the order of more than $10^5$-$10^6$ K/s.

The rapid solidification process may be divided into three categories:

1) hitting a metal liquid flow by high-speed airflow or atomizing the metal liquid flow into fine liquid drops under the effect of a centrifugal force, and finally solidifying the fine liquid drops into powder;

2) spraying a metal liquid onto a chill plate, and solidifying the metal liquid into a very thin metal foil or wire; and 3) melting an extremely thin metal surface layer using laser or electron beam, wherein a whole metal matrix acts as a coolant of itself, then a very high cooling rate also can be obtained.

The rapid solidification process includes an atomization method, a liquid chilling method, a surface layer chilling method by beam flow and so on, and the atomization method is preferred.

The atomization method is to disperse and break a continuous metal melt into atomized molten drops with extremely small size under the effect of an external force such as centrifugal force, mechanical force or impact force of high-speed fluid (gas or liquid), and rapidly cool and solidify the molten drops in contact with the fluid or a cold mold, to become powder after solidification. Main process methods include a gas atomization method, a gas dissolution atomization method, an ultrasonic atomization method and so on. The product is in a form of powder, flake or foil.

The liquid chilling method is to spray a liquid flow onto an inner surface of a roller or an outer surface of the roller or an outer surface of a strip, to obtain a strip-shaped material, including a spinning method by freely jetting solution or a planar flow casting method and so on.

The surface layer chilling method by beam flow is to rapidly melt a surface layer using laser, electron beam and particle beam, including surface alloying, laser rapid melting after surface spraying and rapid melting after ion implantation, among others.

Typical but non-limiting rapid solidification manners include pressurized spraying, high-pressure gas spraying, centrifugal spraying or ultrasonic atomization, among others.

Preferably, the method for preparing nano-quantum dots includes steps of:

(a) providing a carrier, and heating the carrier to form a high-temperature melt as a solvent;

(b) providing a corresponding precursor of target product, reacting and/or thermally cracking the corresponding precursor of target product in the high-temperature melt to obtain ions/atomic groups/molecular groups required for forming target product, and dissolving the ions/atomic groups/molecular groups as solute in the melt; and (c) rapidly solidifying the melt to separate out solute or reactant of the solute upon supersaturation in a short time, so as to obtain the carrier inlaid with the target product nano-quantum dots; and optionally, washing off the carrier and adopting a dispersing means to obtain the target product nano-quantum dots.

The main principle of the present disclosure is that the target substance ions/atomic groups/molecular groups dissolved in the melt cannot be separated out in a large amount during rapid solidification, thus, have a small crystallization scale, and are frozen at original relative positions along with temperature reduction, so as to form the so-called "raisin bread" structure, wherein the raisin is the so-called quantum dot.

As can be seen from the above description and practice, in the present disclosure, the method for preparing nano-quantum dots by rapid solidification of high-temperature melt has a simple technical route, and an exact reaction and thermodynamic growth mechanism, may adopt industrialized rapid solidification device, with small equipment investment, high unit yield and rapid reaction growth, thereby having low cost, high efficiency and capability of continuous production. Moreover, the method in the present disclosure may be widely applied to preparation of quantum dots of a variety of substances, which does not rely on special reaction methods and paths, and is a common platform technology. In the process of preparing quantum dots in the present disclosure, the size and the dispersion degree of the quantum dots may be regulated and controlled by simple, inexpensive and easily controlled factors in industry such as addition proportion of the precursor of the target product and rapid solidification rate (such as rotating speed of centrifugal machine), so that the problems of regulating and controlling the size and the dispersion degree of the quantum dots is solved. The quantum dots prepared have good quality, a small particle size, uniform distribution and narrow distribution.

With the method of the present disclosure, the carrier inlaid with the target product nano-quantum dots (such as glass inlaid with CdSe quantum dots) can be directly obtained, the problem of moisture barrier can be solved, and the quantum dots obtained have a small size, a low dispersion degree, uniform distribution and high quantum yield, and modified nano-quantum dots can be obtained through subsequent modification, for example, a core-shell structure is formed upon passivation of the surface, then the nano-quantum dots have few defects and good stability. In the present disclosure, high-purity quantum dot powder also may be obtained by an inexpensive and efficient method such as water washing, thus facilitating subsequent use.

In a preferred embodiment, the target product includes an inorganic nonmetal, a metal or an inorganic compound.

Preferably, the target product nano-quantum dots include inorganic nonmetal nano-quantum dots (e.g., carbon and silicon quantum dots), metal nano-quantum dots (e.g., gold quantum dots) or inorganic compound nano-quantum dots (e.g., ZnSe, CdS, or CdSe quantum dots).

In a preferred embodiment, the carrier includes one or a combination of at least two of inorganic salts, inorganic bases, oxides, nitrides, carbides, metals and alloys, which are water soluble or readily soluble in acid and base.

Preferably, the carrier includes one or a combination of at least two of NaCl, KCl, glass powder, quartz sand or metal Sn.

In a preferred embodiment, the rapid solidifying includes one or a combination of at least two atomization modes of pressurized spraying, high-pressure gas spraying, centrifugal spraying or ultrasonic atomization.

Preferably, temperature reduction is assisted by means of a refrigerant, pressure reduction or forced convection while the atomization is carried out.

Figure 1:
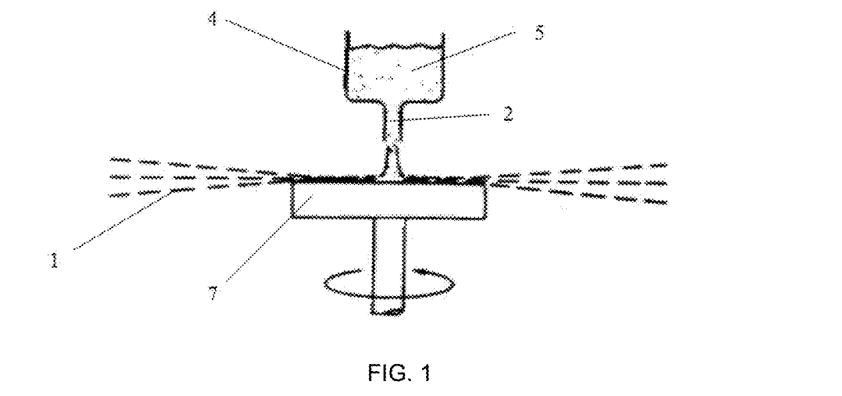
FIG. 1 is a structural schematic view of a centrifugal atomization rapid solidification powder-manufacturing machine in an embodiment of the present disclosure.

Preferably, this process may be carried out by adopting a centrifugal atomization rapid solidification powder-manufacturing machine or a two-roller atomization rapid solidification powder-manufacturing machine, wherein the centrifugal atomization rapid solidification powder-manufacturing machine is as shown in FIG. 1, in which a high-temperature melt 5 is in a crucible 4, a melt liquid flow 2 is dripped on a water-cooled rotary metal disc 7, and atomized fine powder 1 is sprayed to the periphery.

Figure 2:
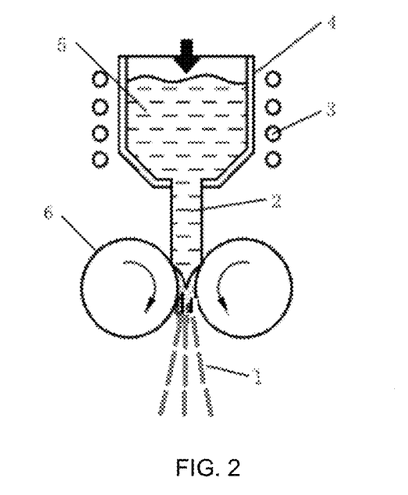
FIG. 2 is a structural schematic view of a two-roller atomization rapid solidification powder-manufacturing machine in another embodiment of the present disclosure.

Preferably, this process may be carried out by adopting a two-roller atomization rapid solidification powder-manufacturing machine, wherein the two-roller atomization rapid solidification powder-manufacturing machine is as shown in FIG. 2, in which a high-temperature melt 5 is in a crucible 4 inside a heater 3, a melt liquid flow 2 is dripped on metal round rollers 6, and atomized fine powder 1 is sprayed to the periphery.

In a preferred embodiment, the corresponding precursor of target product is obtained through organification of corresponding target product or related components of the target product.

The target product after organification can be cracked to give corresponding ions and/or atoms and/or molecules of target product, which are dissolved in the melt of the carrier, and the target product quantum dots inlaid in the carrier fine powder are obtained after rapid solidification.

In a preferred embodiment, the carrier is removed by water washing and/or acid and base washing and dispersing means is adopted to obtain the target product nano-quantum dots.

Preferably, the dispersing means includes adding a dispersing agent and/or ultrasonic dispersing means.

An intermediate carrier in the preparation process is washed off by water and/or acid and base, so that high-purity quantum dot powder can be obtained, and meanwhile the quantum dots can be uniformly dispersed in the solution by a dispersing means, facilitating subsequent application of the quantum dots.

Preferably, a modifier and/or a passivating agent is added so as to modify the target product nano-quantum dots.

Through modification, the modified target product nano-quantum dots can be obtained, and the quantum dot range is broadened.

In a preferred embodiment, the method for preparing nano-quantum dots further includes:

heating, after obtaining the carrier inlaid with the target product nano-quantum dots, the carrier for a second time to form a high-temperature melt to keep the nano-quantum dots to be uniformly dispersed in the melt, and adding a modifier and/or a passivating agent so as to modify the target product nano-quantum dots; and then rapidly solidifying the melt to obtain the carrier inlaid with the modified target product nano-quantum dots, or directly pouring the melt into a mold for cooling and molding.

After the carrier inlaid with the target product nano-quantum dots is obtained, the quantum dots may be further modified in a manner similar to the preparation manner, that is, using the method of rapid solidification of high-temperature melt: heating the carrier again to form a high-temperature melt, adding a modifier and/or a passivating agent so as to modify the target product nano-quantum dots, then rapidly solidifying the melt to obtain the carrier inlaid with the modified target product nano-quantum dots; alternatively, heating the carrier again to form a high-temperature melt, adding a modifier and/or a passivating agent so as to modify the target product nano-quantum dots, and then directly pouring the melt into a mold for cooling and molding.

The application of quantum dots may be further expanded through modification, and the core-shell type quantum dots can be formed. After the core-shell structure is formed by this method, the quantum dots have few defects and good stability, so that the fluorescent spectrum is wide, the color is bright, and the luminescence lifetime is long.

A molded body having quantum dots can be obtained by pouring the high-temperature melt with the uniformly dispersed nano-quantum dots into the mold for cooling and forming, and the operation is simple and convenient. For example, the high-temperature melt dispersed with the nano-quantum dots is poured into a water-cooled mold for condensation and molding to obtain a molded carrier inlaid with the nano-quantum dots, or the high-temperature melt dispersed with the nano-quantum dots is poured on a carrier (such as glass) in a supercooled state, and the nano-quantum dots float on the carrier for condensation and deposition to obtain a carrier with nano-quantum dot film.

In a preferred embodiment, the carrier is heated to 450-1500° C., preferably 450-600° C., or 750-900° C., or 1000-1200° C. to form a high-temperature melt of the carrier.

The heating temperature is typically, but not limited to, for example, 450° C., 500° C., 550° C., 600° C., 650° C., 700° C., 750° C., 800° C., 850° C., 900° C., 950° C., 1000° C., 1100° C., 1200° C., 1300° C., 1400° C. or 1500° C.

The high-temperature melt is formed by heating the carrier such as inorganic salt, inorganic base, oxide, nitride, carbide, metal or alloy to a certain temperature.

In a preferred embodiment, the corresponding precursor of target product is uniformly mixed in the carrier, heated to a high temperature (e.g. 450-1500° C.), and reacted and/or thermally cracked to obtain the high-temperature melt of the carrier dissolved with corresponding ions/atomic groups/molecular groups of target product.

Preferably, a mass ratio of the corresponding precursor of target product to the high-temperature melt of the carrier is (0.01-1):(99-99.99), for example, 0.01:99.99, 0.02:99.98, 0.05:99.95, 0.1:99.9, 0.2:99.8, 0.3:99.7, 0.4:99.6, 0.5:99.5, 0.6:99.4, 0.7:99.3, 0.8:99.2, 0.9:99.1 or 1:99, preferably (0.1-0.5):(99.5-99.9).

The content of quantum dots in the carrier may be adjusted by adjusting the mass ratio of the precursor of target product to the carrier melt, and the regulation and control manner is simple and has strong controllability.

According to a second aspect of the present disclosure, a nano-quantum dot material prepared by the above method for preparing nano-quantum dots is provided.

Preferably, the nano-quantum dot material includes powder, a solution or a molded body containing the nano-quantum dots.

The solvents of typical solutions containing nano-quantum dots include ethanol and polyvinylpyrrolidone (PVP), etc. Typical molded bodies containing nano-quantum dots include nano-quantum dot glass.

By the method of the present disclosure, the carrier powder material inlaid with the nano-quantum dots can be directly obtained, and the carrier also may be washed off through a subsequent manner such as water washing to obtain high-purity quantum dot powder, and the high-purity quantum dot powder is stored in a solvent, or the high-temperature melt dispersed with the nano-quantum dots is poured into a mold for cooling and molding to obtain a molded body having the quantum dots.

In the nano-quantum dot material prepared by the preparation method of the present disclosure, the nano-quantum dots have good quality, a small size, a low dispersion degree and uniform distribution, and the high-purity quantum dot powder or the nano-quantum dot material with a special structure such as core-shell structure may also be obtained through subsequent treatment, and the nano-quantum dots have few defects, good stability and good application effect.

According to a third aspect of the present disclosure, use of the nano-quantum dot material prepared by the above method for preparing nano-quantum dots in the fields of photoelectric devices, biomarkers or semiconductors is provided.

According to a fourth aspect of the present disclosure, a quantum dot article containing the nano-quantum dot material prepared by the above method for preparing nano-quantum dots is provided.

Typical but non-limiting quantum dot articles include photoelectric products (e.g., quantum dot displays, quantum dot televisions and QLED, etc.), chemical products (e.g., bioprobes, etc.), and nano-quantum dot semiconductor chips, etc.

In the text below, the present disclosure will be described with more details according to the following specific examples and comparative examples. However, the following examples and comparative examples are provided merely for illustrating the present disclosure, while the scope of the present disclosure is not limited thereto, and all of raw materials involved in the present disclosure are commercially available.

Example 1

A method for preparing carbon nano-quantum dots by atomization and rapid solidification of NaCl molten salt, including steps of:

(1) heating NaCl to 1100° C. in a high-temperature smelter to form a high-temperature melt as a solvent, wherein the high-temperature smelter is protected with nitrogen;

(2) selecting glucose as a precursor and homogeneously mixing glucose with NaCl in a mass ratio of 0.5:99.5, and then directly adding the mixture to the high-temperature smelter, to undergo thermal cracking to obtain atomic carbon dissolved in the NaCl molten salt;

(3) dripping the melt of the NaCl molten salt dissolved with the atomic carbon through a nozzle at a bottom of the high-temperature smelter to a water-cooled rotary metal disc 7 of a centrifugal atomization rapid solidification powder-manufacturing machine rotating at a high speed (rotating speed of 5300/min, disc diameter of 1.1 meters, as shown in FIG. 1), spraying the atomized and condensed atomized fine powder 1 of the salt containing carbon quantum dots into a collecting barrel at the periphery, which process is assisted by ultrasonic atomization to realize rapid solidification, such that carbon quantum dots inlaid in NaCl fine powder are obtained.

Figure 3:
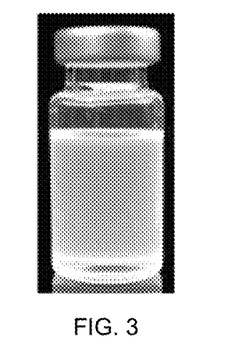
FIG. 3 shows an ethanol solution of carbon nano-quantum dots obtained in Example 1 of the present disclosure.
Figure 4:
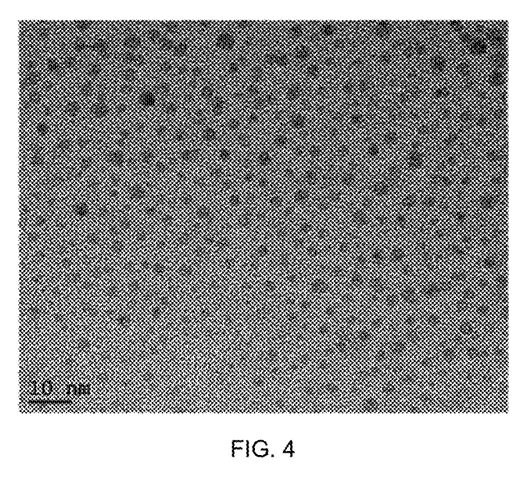
FIG. 4 is a TEM image of the carbon nano-quantum dots obtained in Example 1 of the present disclosure.

The above fine powder was washed with hot water, and centrifuged, and stood, then a clarified liquid was poured out, and these steps were repeated until the salt was completely washed off. This process was assisted by ultrasound dispersion throughout the process. The finally obtained carbon quantum dots were stored in an ethanol/water mixed solution, as shown in FIG. 3. Fluorescence phenomenon could be observed via ultraviolet irradiation; the carbon quantum dot ethanol suspension was dropwise added with a pipette on a carbon support grid of TEM, and after ethanol and water evaporated, the nanostructure of the carbon quantum dots could be observed, as shown in FIG. 4.

Example 2

A method for preparing gold nano-quantum dots by atomization and rapid solidification of NaCl/KCl mixed molten salt, including steps of:

(1) heating NaCl/KCl mixed salt to 1200° C. in a high-temperature smelter to form a high-temperature melt as a solvent, wherein the high-temperature smelter is protected with nitrogen;

(2) selecting gold chloride as a precursor and homogeneously mixing gold chloride with NaCl and KCl in a mass ratio of 0.2:49.9:49.9, and then directly adding the mixture to the high-temperature smelter, to undergo thermal cracking to obtain atomic gold dissolved in the NaCl/KCl molten salt;

(3) dripping the melt of the molten salt dissolved with the atomic gold through a nozzle at a bottom of the high-temperature smelter on metal round rollers 6 of a two-roller atomization rapid solidification powder-manufacturing machine rotating at a high speed (as shown in FIG. 2), spraying the atomized and condensed atomized fine powder 1 of the salt containing nano gold into a collecting barrel containing water at the bottom, which process is assisted by ultrasonic atomization to realize rapid solidification, such that gold nano-quantum dots inlaid in the NaCl/KCl fine powder are obtained.

The above fine powder was washed with hot water, and centrifuged, and stood, then a clarified liquid was poured out, and these steps were repeated until the salt was completed washed off. This process was assisted by ultrasound dispersion throughout the process, and the gold nano-quantum dots finally obtained were stored in a PVP solution, i.e. becoming a nano gold colloid.

Example 3

A method for preparing silicon nano-quantum dots by atomization and rapid solidification of NaCl molten salt, including steps of:

(1) heating NaCl to 1200° C. in a high-temperature smelter to form a high-temperature melt as a solvent, wherein the high-temperature smelter is protected with nitrogen;

(2) selecting a gas $SiH_4$ as a precursor to continuously pass into a high-temperature smelter, and undergo thermal cracking to obtain atomic silicon dissolved in the NaCl molten salt; and (3) atomizing the melt of the NaCl molten salt mixed with the silicon source through gas of a nozzle of the high-temperature smelter, wherein the high-temperature smelter is provided with a concentric nozzle at the bottom, a melt is in the middle of the structure thereof, and a high-pressure gas channel is around the structure thereof, spraying the condensed spray fine powder of the salt containing the silicon quantum dots into a collecting barrel, which process is assisted by ultrasonic atomization so as to realize rapid solidification, such that the silicon quantum dots inlaid in the NaCl fine powder are obtained.

The above fine powder was washed with hot water, and centrifuged, and stood, then a clarified liquid was poured out, and these steps were repeated until the salt was completed washed off. This process was assisted by ultrasound dispersion throughout the process. The finally obtained silicon quantum dots were stored in degassed water. The silicon quantum dots might be applied to the semiconductor and photoelectric fields.

Example 4

A method for preparing CdSe nano-quantum dots using secondary solidification of glass, including steps of:

(1) heating glass powder to 1400° C. in a high-temperature smelter to form a high-temperature melt as a solvent, wherein the high-temperature smelter is protected with nitrogen/argon;

(2) selecting dimethylcadmium ($Cd(CH_3)_2$) and trioctylphosphine selenide (SeTOP) as precursor, and after reaction, generating CdSe molecular groups, and dissolving the CdSe molecular groups in the glass melt;

(3) dripping the glass melt through a nozzle at a bottom of the high-temperature smelter to a rotary metal disc 7 of a centrifugal atomization rapid solidification powder-manufacturing machine rotating at a high speed (as shown in FIG. 1), spraying the atomized and condensed glass fine powder containing CdSe into a collecting barrel at the periphery, which process is assisted by ultrasonic atomization to realize rapid solidification, such that CdSe nano-quantum dots inlaid in the glass powder are obtained.

The above fine powder was further added to the high-temperature smelter again and heated to 1400° C. to form a high-temperature melt, ZnSe was added as a passivating agent, with continuous electromagnetic stirring; finally, the resultant was poured into a water-cooled copper mold to be condensed and molded, to obtain the glass inlaid with core-shell CdSe/ZnSe quantum dots with high performance and high quality.

The above glass inlaid with the CdSe quantum dots naturally can solve the problem of moisture barrier, the quantum dots have a small and controllable size, a low dispersion degree and uniform distribution, and after the core-shell structure is formed upon passivation of the surface, the quantum dots have few defects and good stability, so that the fluorescence spectrum is wide, the color is bright and the luminescence lifetime is long.

Example 5

A method for preparing silicon nano-quantum dots by atomization and rapid solidification of molten metal Sn, including steps of:

(1) heating metal Sn to 1200° C. in a high-temperature smelter to form a high-temperature melt as a solvent, wherein the high-temperature smelter is protected with nitrogen;

(2) selecting a gas $SiH_4$ as a precursor to continuously pass into the high-temperature smelter, and undergo thermal cracking to obtain atomic silicon dissolved in the metal Sn melt;

(3) dripping the above melt through a nozzle at a bottom of the high-temperature smelter to metal round rollers 6 of a two-roller atomization rapid solidification powder-manufacturing machine rotating at a high speed (as shown in FIG. 2), spraying the atomized and condensed metal Sn fine powder containing silicon nano-quantum dots into a collecting barrel containing water at the bottom, which process is assisted by ultrasonic atomization to realize rapid solidification, such that silicon nano-quantum dots inlaid in the metal Sn fine powder are obtained.

Further, a plate glass was first placed on the metal Sn melt heated to 400° C. in the high-temperature smelter; the above fine powder was uniformly poured into the metal Sn melt and maintained at a temperature of 400° C., with continuous electromagnetic stirring; meanwhile, the plate glass was kept in a supercooled state with cold nitrogen gas flow, the silicon nano-quantum dots floated up, and condense and deposit on the plate glass, and finally glass with a silicon nano-quantum dot film was obtained.

Comparative Example 1

A method for preparing carbon nano-quantum dots, including steps of:

electrochemically stripping graphite, inserting two identical graphite rods as anode and cathode (length of 13 cm, width of 0.6 cm) into 600 mL of ultrapure water electrolyte, with a depth of 3 cm and an interval of 7.5 cm, adding a static potential of 15-60 V between two electrodes to electrolyze for 10 days, with vigorous stirring, then obtaining a dark yellow solution and filtering the solution, followed by centrifugation at 22000 rpm for 30 min to remove impurities, and finally obtaining a CQDs solution.

Comparative Example 2

A method for preparing gold nano-quantum dots, including steps of:

(1) adding 50 mL of 10 mM chloroauric acid $HAuCl_4$ aqueous solution to 50 mL of 50 mg/L bovine serum albumin BSA aqueous solution at 37° C., after stirring at 37° C. for 5 min, adding 5 mL of 1 mol/L sodium hydroxide NaOH aqueous solution, followed by water bath reaction at 37° C. for 12 h; and (2) centrifuging the prepared gold quantum dots at 14000 r/min for 30 min, taking supernatant and adding the supernatant to a dialysis bag with a molecular weight cut-off of 14 kDa for dialysis for 4 days, and then filtering and sterilizing with a millipore filter having a pore size of 0.22 μm, and placing the resultant at 4° C. for subsequent use.

Comparative Example 3

A method for preparing silicon nano-quantum dots, including steps of:

(1) adding anhydrous toluene (50 mL) to a Schlenk bottle and sealing the Schlenk bottle with a rubber plug; (2) performing non-oxidation treatment with three cycles of liquid nitrogen freezing-vacuuming-nitrogen filling-thawing; (3) filling up the Schlenk bottle with nitrogen; (4) adding 128 uL of hexyltrichlorosilane and 100 uL of tetrachlorosilane (in this case, a molar ratio of hexyltrichlorosilane to tetrachlorosilane is 1:1) respectively with a microsampler; (5) ultrasounding for 30 minutes; (6) adding 4 mL of lithium aluminum hydride dissolved in tetrahydrofuran using a syringe; (7) ultrasounding for 120 min, wherein equations of reaction process at this time are: $SiCl_4$+ $4LiAlH_4$=Si+$4LiCl$+$4AlH_3$+$2H_2$, $2C_6H_{12}SiCl_3$+ $6LiAlH_4$=2Si—$C_6H_{12}$+$6LiCl$+$6AlH_3$+$3H_2$, respectively; (8) removing residual lithium aluminum hydride by means of injecting 40 mL of methanol, wherein the removal principle is to use the following reaction: $LiAlH_4$+ $4CH_3OH$=$4H_2$+$CH_3O$—Li+$(CH_3O)_3$—Al; (9) removing the solvent from the obtained silicon quantum dots by a method of distillation under reduced pressure; and (10) dispersing the obtained silicon quantum dots in a n-hexane solution, and finally, purifying the resultant with a 450 nm PVDF needle filter to remove relatively large impurities, silicon simple substance, to obtain a silicon quantum dot n-hexane solution.

Comparative Example 4

A method for preparing CdSe nano-quantum dots, including steps of:

mixing 0.077 g of CdO ($6 \times 10^{-4}$ mol) with 0.68 g ($24 \times 10^{-4}$ mol) of oleic acid (their molar ratio is 1:4) in a 50 mL three-neck flask, then introducing argon, raising the temperature to 100° C., and maintaining the temperature for 30 min, then heating the resultant to 220° C. to obtain cadmium oleate, removing heating jacket to stop heating when the mixture becomes a clear solution from slight red, cooling the resultant to room temperature, to obtain a cadmium stock solution, after cooling the cadmium solution to room temperature, placing the cadmium solution in a vacuum drying box to undergo dehydration for 30 min at a temperature set at 150° C., and taking out cadmium solution and immediately placing the cadmium solution in a dryer to be cooled to room temperature. Under oxygen-free conditions, 1.4 g of Se is dissolved in 3.84 g of TBP, and then further diluted with 12.33 g of ODE to obtain a selenium solution.

In the above cadmium solution cooled to room temperature, 1.5 g (5.57 mmol) of ODA, 0.5 g (1.29 mmol) of TOPO and 2 g of (7.92 mmol) ODE (ODE acting as non-ligand solvent, ODA acting as ligand for nanocrystals) were added. In an argon atmosphere, the cadmium solution was heated (the mixture needed to undergo degassing treatment before heating up, and the temperature was raised to 100° C. by introducing argon, and kept for 30 min), after the temperature reached 280° C., 3 g of the selenium solution (containing selenium of 3 mmol) was quickly injected (with rapid stirring, the injection liquid did not need to be added dropwise. The injecting rate was restricted only by aperture of the needle, but at least 5 mL of the solution was injected within 1 s). In synthesis reaction, Se was excess, generally, 5~10 times (molar ratio) compared with Cd. After injection, the temperature of the reaction mixture dropped, and was kept at 260° C., at which temperature quantum dots grew.

Test Example

The particle sizes of the nano-quantum dots obtained in Examples 1-4 and Comparative Examples 1-4 were measured, and the results are shown in Table 1 below.

The particle sizes were tested by TEM, and the standard deviations of the particle size range were calculated.

TABLE 1

| Samples | Particle Size | Standard Deviation (%) |
| --- | --- | --- |
| Example 1 | 1.8-2.3 nm | 9.6 |
| Example 2 | 5.0-7.9 nm | 15.2 |
| Example 3 | 3.1-5.2 nm | 11.0 |
| Example 4 | 2.3-3.0 nm | 12.1 |
| Comparative Example 1 | 2.8-9.7 nm | 18.7 |
| Comparative Example 2 | 5.1-12.2 nm | 17.4 |
| Comparative Example 3 | 3.3-8.5 nm | 21.3 |
| Comparative Example 4 | 2.2-3.3 nm | 14.6 |

As shown in Table 1, it can be proved that the nano-quantum dots prepared by the method using rapid solidification of a high-temperature melt in the present disclosure have a small particle size, narrow distribution, few later defects and good stability.

Carbon nano-quantum dots, gold nano-quantum dots, silicon nano-quantum dots and CdSe nano-quantum dots of Comparative Examples 1-4, prepared by conventional methods, have complicated process, high cost, large particle size, wide distribution and difficulty in controlling the particle size.

Compared with Example 1, Comparative Example 1 has a long process time (10 days or more), high cost and low yield (microgram~milligram grade), while Example 1 of the present disclosure produces a large amount of quantum dots daily in an industrial scale, possibly up to the order of kilograms per hour, and daily yield of 10 kilograms or more, then having low cost and high efficiency. Moreover, the present method, without restriction to the type of quantum dots, is a platform approach, which has strong controllability, and renders the obtained quantum dots with a small particle size and narrow distribution.

Although the present disclosure has been illustrated and described with specific examples, it should be realized that many other alterations and modifications may be made without departing from the spirit and scope of the present disclosure. Therefore, it means that the attached claims cover all of these changes and modifications within the scope of the present disclosure.

What is claimed is:

1. A method for preparing nano-quantum dots, comprising a step of:
solidifying, at a cooling rate of the order of more than $10^5$ K/s, a melt of a carrier dissolved with corresponding ions and/or atomic groups and/or molecular groups of a target product, so as to obtain the carrier inlaid with the nano-quantum dots of the target product.

2. The method for preparing nano-quantum dots according to claim 1, wherein the ions and/or atomic groups and/or molecular groups of the target product are obtained by reacting and/or thermally cracking a corresponding precursor of the target product in the melt.

3. The method for preparing nano-quantum dots according to claim 1, comprising steps of:
(a) providing the carrier, and heating the carrier to form the melt as a solvent;
(b) providing a corresponding precursor of the target product, reacting and/or thermally cracking the corresponding precursor of the target product in the melt, so as to obtain the ions and/or atomic groups and/or molecular groups required for forming the target product, and dissolving the ions and/or atomic groups and/or molecular groups as solute in the melt;
(c) solidifying the melt to separate out the solute or reactant of the solute upon supersaturation in a short time, so as to obtain the carrier inlaid with the nano-quantum dots of the target product; and
(d) washing off the carrier and adopting a dispersing means to obtain the nano-quantum dots of the target product.

4. The method for preparing nano-quantum dots according to claim 1, wherein the target product comprises an inorganic nonmetal simple substance, a metal or an inorganic compound.

5. The method for preparing nano-quantum dots according to claim 3, wherein
the carrier is removed by water washing and/or acid and base washing and a dispersing means is adopted to obtain the nano-quantum dots of the target product, wherein the dispersing means comprises adding a dispersing agent and/or ultrasonic dispersing means.

6. The method for preparing nano-quantum dots according to claim 1, wherein the method further comprises:
heating, after obtaining the carrier inlaid with the nano-quantum dots of the target product, the carrier again to form the melt to keep the nano-quantum dots to be uniformly dispersed in the melt, and adding a modifier and/or a passivating agent so as to modify the nano-quantum dots of the target product; and then solidifying the melt to obtain the carrier inlaid with modified nano-quantum dots of the target product, or directly pouring the melt into a mold for cooling and molding.

7. The method for preparing nano-quantum dots according to claim 1, wherein the carrier is heated to 450-1500° C.

8. The method for preparing nano-quantum dots according to claim 4, wherein the nano-quantum dots of the target product comprise elemental quantum dots, binary compound quantum dots or ternary compound quantum dots.

9. The method for preparing nano-quantum dots according to claim 4, wherein the carrier comprises one of inorganic salts, inorganic bases, oxides, nitrides, carbides, metals and alloys, which are water soluble or readily soluble in acid and base, or a combination thereof.

10. The method for preparing nano-quantum dots according to claim 4, wherein the carrier comprises inorganic salts, inorganic bases, oxides, nitrides, carbides, metals or alloys, which are readily soluble in water or readily soluble in acid and base.

11. The method for preparing nano-quantum dots according to claim 10, wherein the carrier comprises one of NaCl, KCl, Na2SO4, K2SO4, NaOH, KOH, glass powder, quartz sand, metal Sn, metal Ni, metal Cu, metal Fe, metal Au, metal Ag, metal Bi, metal In and metal Ga, or a combination thereof.

12. The method for preparing nano-quantum dots according to claim 4, wherein the solidifying comprises one of pressurized spraying, high-pressure gas spraying, centrifugal spraying and ultrasonic atomization, or a combination of at least two atomization modes therefrom.

13. The method for preparing nano-quantum dots according to claim 4, wherein an auxiliary cooling is performed by means of a refrigerant, pressure reduction or forced convection while atomization is carried out.

14. The method for preparing nano-quantum dots according to claim 7, wherein the carrier is heated to 450-600° C., or 750-900° C., or 1000-1200° C. to form the melt of the carrier.

15. The method for preparing nano-quantum dots according to claim 7, wherein a corresponding precursor of the target product is uniformly mixed in the carrier, heated to 450-1500° C., and reacted and/or thermally cracked to obtain the melt of the carrier dissolved with the corresponding ions and/or atomic groups and/or molecular groups of the target product.

16. The method for preparing nano-quantum dots according to claim 7, wherein a mass ratio of a corresponding precursor of the target product to the melt of the carrier is 0.01: 99.99-1: 99.

* * * * *